Sept. 4, 1934.　　　　　L. HIRSCHHORN　　　　　1,972,264

RECEPTACLE

Filed Nov. 21, 1931

INVENTOR
LOUIS HIRSCHHORN
BY
Redding, Greeley, O'Shea + Campbell
ATTORNEYS

Patented Sept. 4, 1934

1,972,264

UNITED STATES PATENT OFFICE 1,972,264

RECEPTACLE

Louis Hirschhorn, New York, N. Y., assignor to Millie Patent Holding Co., Inc., New York, N. Y., a corporation of New York Application November 21, 1931, Serial No. 576,458

1 Claim. (Cl. 150—48)

The present invention relates to receptacles for receiving substances from which juices are to be extracted and embodies, more specifically, an improved receptacle and method of manufacturing the same whereby the manipulation thereof during operation is greatly facilitated and the removal and replacement in extracting apparatus is greatly facilitated. More particularly, the invention embodies an improved form of bag or other receptacle adapted for use in connection with large urns or other vessels for the brewing of beverages, such as coffee and the like. While the present invention is applicable to any device wherein it is desired that juices be extracted from substances, the invention will be described as being embodied in a bag for use in urns wherein coffee is brewed as well as the method of manufacturing the bag.

In connection with receptacles of this character, the common practice is now to provide a bag having a continuous hem around the top periphery thereof in which an opening is formed. Within this hem, a metal binding or stiff wire is threaded, the binding being annular in shape and interrupted at one portion whereby it may be threaded into the hem of the bag and the interrupted portion of the binding closed to form a complete annular rim. This rim is adapted to engage suitable supporting means within the coffee urn and thus support the bag within the urn to adapt the juices to be extracted therefrom. After a bag has been used several times, it is necessary to replace the same by a fresh bag and the metal binding is thus removed from the hem and threaded into a new bag. This operation is a very difficult one to perform inasmuch as the old bag is wet and hot and furthermore, the time available for the replacement is very limited. Obviously, during rush hours in restaurants, very little time can be spared for operations of this character.

An object of the invention, accordingly, is to provide an improved urn bag of such character as to be effectively supported in an urn and to which a rigid supporting rim is permanently secured.

A further object of the invention is to provide a bag of the above character wherein means is incorporated for enabling the bag to be removed effectively from the urn.

A further object of the invention is to provide an urn bag of unitary construction including a substantially rigid supporting member, the construction being such that the entire bag and supporting structure may be discarded for use without increasing the cost of the mechanism.

A further object of the invention is to provide an improved urn bag or the like wherein a metallic rim is effectively and permanently secured to the rim of the bag.

A further object of the invention is to provide an improved method of manufacturing an urn bag whereby a rim is permanently secured to the upper periphery of the bag.

Further objects, not specifically enumerated above, will be apparent as the invention is described in greater detail in connection with the accompanying drawing, wherein.

Figure 1:
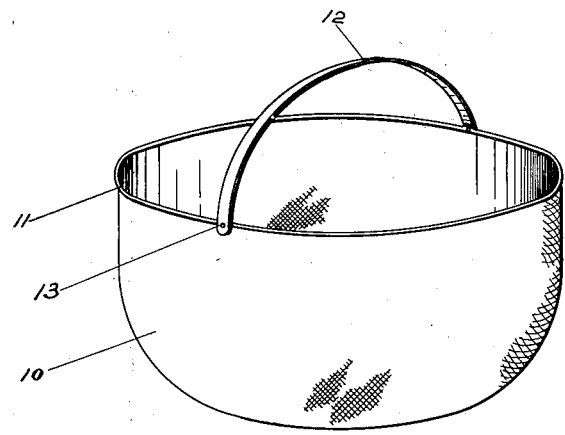
Figure 1 is a perspective view of a bag formed with a handle in accordance with the present invention.

Referring to the above drawing, a bag 10 is illustrated in Figure 1 as being formed of any suitable fabric, preferably of gauze or other porous fabric having sufficient strength to support the quantity of coffee or other substance from which juices are to be extracted. This bag is provided with a rim 11, as described hereinafter and a handle 12 is pivoted to the rim at each end thereof as indicated at 13. This handle is adapted to swing into the plane of the rim and thus lie in such position as not to interfere with the functioning of the bag or machine in which it is placed. When the bag is to be removed from the urn or other container, the handle 12 is swung into the position shown in Figure 1 and thus affords a convenient means for lifting the bag and its contents from the urn.

Figure 2:
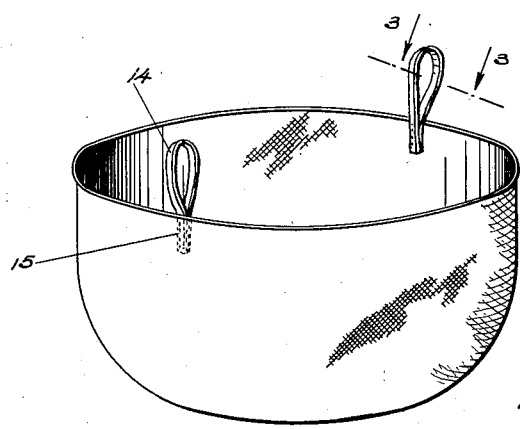
Figure 2 is a perspective view similar to Figure 1 showing a modified form of bag.
Figure 3:
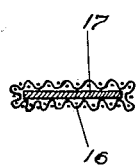
Figure 3 is a view in section, taken on line 3—3 of Figure 2, and looking in the direction of the arrows.

In the construction shown in Figure 2, the bag is provided with a plurality of loops 14 which are stitched to the side of the bag at 15 and, as shown in Figure 3, may be formed of sleeves 16 within which a suitable yielding stiffening member 17 is positioned. When the bag is inserted within the container, the loops yield to any portion of the container which normally occupies the space above the bag and, when the container is opened the loops return to the position shown in Figure 2. This movement is rendered more positive by lapping the ends of each loop to extend in the same direction, as clearly shown in Figure 2, and the weight of the contents within the bag, stretching the material of the bag from the rim 11 thereof, serves to cause the loops to be moved even more positively into the position shown in Figure 2. The specific stiffening material used forms no part of the present invention and it may be either of metal, celluloid, or other suitable substance.

Figure 4:
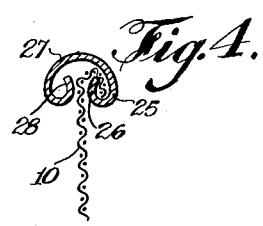
Figure 4 is a detail view in section, taken through the rim of a bag constructed in accordance with the present invention.

In the construction shown in Figure 4, a metallic rim or supporting band 25 is rolled onto the upper rim of the fabric 10, the band including a reversely turned portion 26 which clamps the edge of the fabric between the same and the adjacent portion of the band 25, the remaining portion 27 of the band 25 being turned or rolled downwardly parallel to the fabric 10 and reversely turned at 28 to be compressed against the fabric of the bag and thus secure the same in position. In connection with the construction shown in Figure 4, the reversely turned portion 28 not only effectively serves to prevent removal of the fabric from the band by reason of the direction in which the end 28 extends, but the construction is such as to impart a continuous pressure against the fabric through the reversely turned portion 28 in view of the bends imparted to the band.

From the foregoing, it will be seen that the bag may be formed with a rim which is sufficiently rigid to support the bag and thus the replacement of bags is greatly facilitated inasmuch as there is no securing operation necessary between the supporting rim and bag.

While the invention has been described with specific reference to the accompanying drawing, it is not to be limited, save as defined in the appended claim.

I claim as my invention:

As an article of manufacture, a porous fabric receptacle having a metallic band rolled upon the rim of the bag, the band having a reversely turned side between which and the adjacent band portion, the rim of the bag is clamped, and the remaining portion of which band extends over the edge of the reversely turned portion and extends in the direction of the fabric of the bag, the side of the last named portion of the band being turned upwardly to extend in the same direction as the first named reversely turned portion and clamping the fabric of the bag between the two parallel reversely turned sides of the band.

LOUIS HIRSCHHORN.